United States Patent [19]

Sartorio

[11] Patent Number: 4,770,596
[45] Date of Patent: Sep. 13, 1988

[54] MANIPULATOR DEVICE PARTICULARLY FOR HANDLING METAL SHEETS DURING FOLDING OPERATIONS

[75] Inventor: Franco Sartorio, Turin, Italy

[73] Assignee: Prima Industrie, S.p.A., Turin, Italy

[21] Appl. No.: 880,703

[22] Filed: Jul. 1, 1986

[30] Foreign Application Priority Data

Jul. 15, 1985 [IT] Italy ................. 67648 A/85

[51] Int. Cl.⁴ ..................................... B66C 1/00
[52] U.S. Cl. ........................... 414/732; 414/735; 901/8; 901/17
[58] Field of Search ............. 414/718, 728, 732, 735; 901/8, 15, 17, 25

[56] References Cited

U.S. PATENT DOCUMENTS

| | | | |
|---|---|---|---|
| 1,491,384 | 4/1924 | Eidmann | 414/732 |
| 2,697,529 | 12/1954 | Hubbell et al. | 414/732 |
| 3,047,166 | 7/1962 | Lamp et al. | 414/732 |
| 3,262,593 | 7/1966 | Hainer | 414/735 X |
| 3,272,347 | 9/1966 | Lemelson | 414/735 X |
| 3,888,362 | 6/1975 | Fletcher et al. | 901/17 X |
| 4,056,198 | 11/1977 | Boserup | 414/732 X |
| 4,275,986 | 6/1981 | Engelberger et al. | 414/732 X |
| 4,458,566 | 7/1984 | Tajima | 414/735 X |
| 4,507,046 | 3/1985 | Sugimoto et al. | 414/735 |
| 4,551,058 | 11/1985 | Mosher | 414/735 |

FOREIGN PATENT DOCUMENTS 30076 3/1981 Japan ................. 901/17

Primary Examiner—Kenneth J. Dorner
Assistant Examiner—Thomas A. Rendos
Attorney, Agent, or Firm—Omri M. Behr

[57] ABSTRACT

A manipulator device is described in which a pair of holding members mounted on extensible arms, are rotatable through 360° about an axis parallel to the plane in which they lie and perpendicular to the axis of the arms, and in which the arms are actuated by motor means interconnected together in such a way as to link the holding members for simultaneous displacement in a symmetrical manner.

5 Claims, 3 Drawing Sheets

MANIPULATOR DEVICE PARTICULARLY FOR HANDLING METAL SHEETS DURING FOLDING OPERATIONS

BACKGROUND OF THE INVENTION

The present invention relates to a manipulator device particularly adapted to effect handling of metal sheets of different dimensions during folding operations. In particular the present invention relates to a manipulator device adapted to be employed as an integral part of an automated system for folding sheet metal by means of folding presses.

Known manipulator devices all have physical structures which are not well adapted to obtain an efficient manipulation of metal sheets of widely differing dimensions in that they generally comprise a single extensible arm on which a frame is rotatably mounted, the frame being provided with a plurality of holding devices, usually of magnetic type (magnets) or pneumatic type (vacuum suckers), such manipulator devices are limited in the movements which the frame can make, are bulky and cumbersome, and require the replacement of the holding member upon variation in the dimensions of the metal sheet to be handled.

SUMMARY OF THE INVENTION

The object of the invention is that of providing a manipulator device of simple structure and restricted cost, which will be capable of efficiently handling metal sheets, even sheets of very different dimensions from one another without requiring the replacement of the holding members.

The said object is achieved by the invention in that it relates to a manipulator device, particularly for the handling of metal sheets during folding operations, comprising a pair of holding members and means for displacing the said holding members along three Cartesian axes to a plurality of different positions, characterised by the fact that the said holding members are rotable through 360° about an axis parallel to the plane in which they lie and by the fact that the said means for displacing the said holding members include a pair of independent extensible arms each carrying one of the said holding members, and motor means interconnected together in such a way as to link the said independent arms for simultaneous displacement in a specularly symmetric manner with respect to a plane of symmetry of the said device passing through the said arms.

BRIEF DESCRIPTION OF THE DRAWINGS

For a better understanding of the invention there is now given a non-limitative description of several embodiments with reference to the attached drawings, in which.

DETAILED DESCRIPTION OF THE INVENTION

Figure 1:
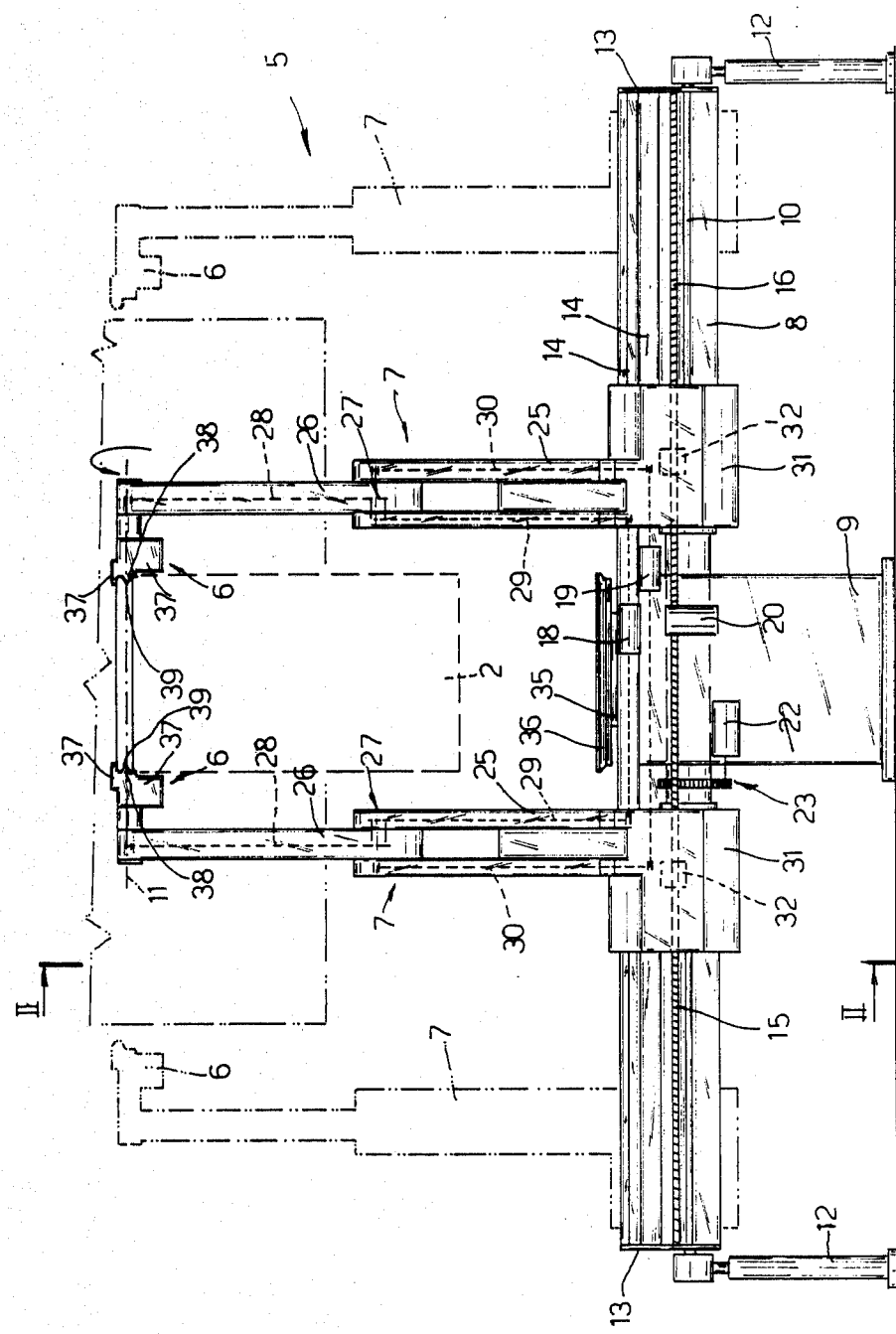
FIG. 1 schematically illustrates a front view in elevation of the manipulator device according to the invention.
Figure 2:
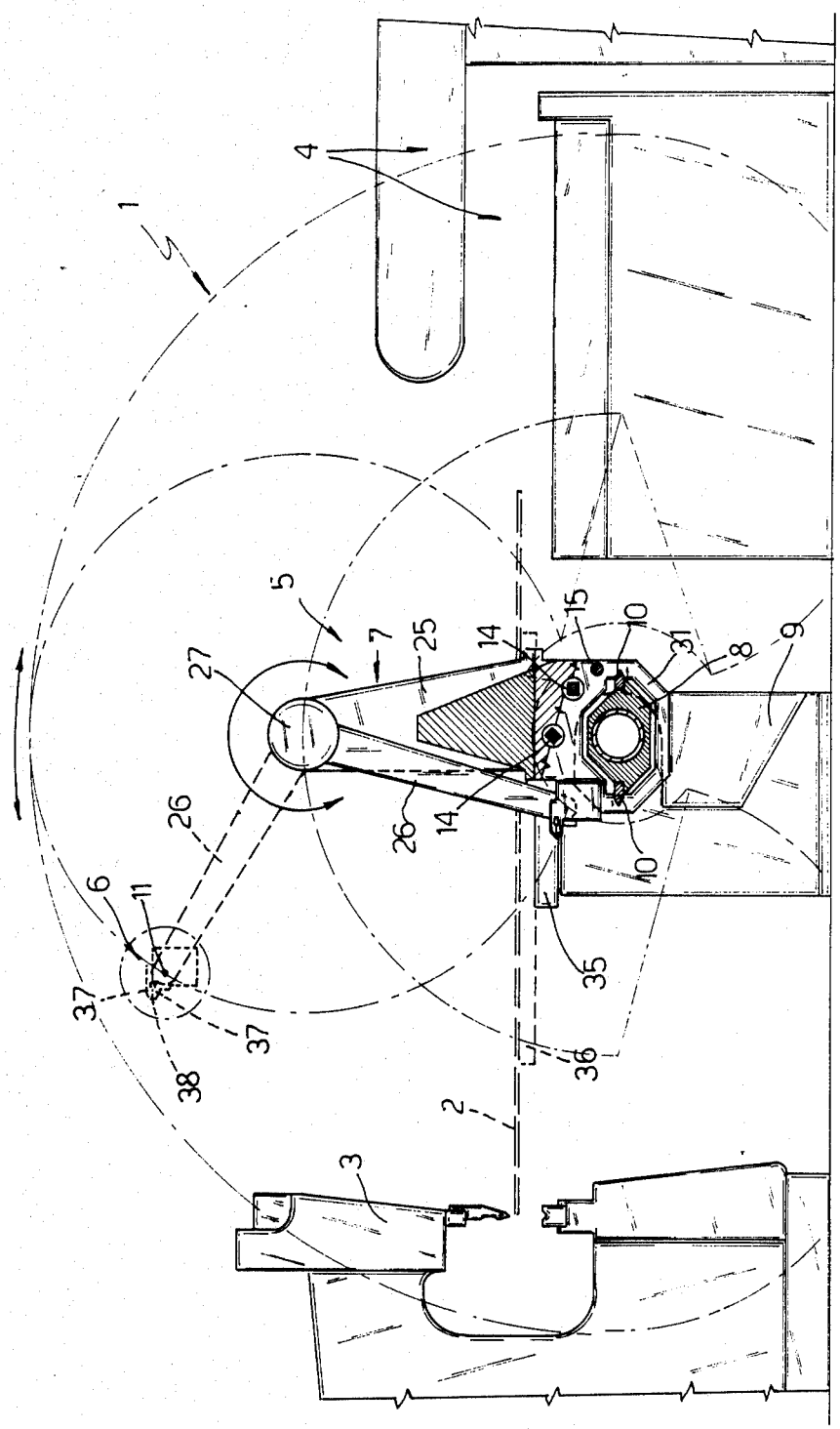
FIG. 2 illustrates an orthogonal view of a section of the device of FIG. 1 taken on the line II—II.

With reference to FIGS. 1 and 2 there is generally indicated with the reference numeral 1 a system for the automatic folding of a metal sheets 2, comprising a folding press 3 of known type, conveyors 4 for the metal sheets 2, and a mechanical manipulator device 5 disposed between the conveyors 4 and the folder 3 for handling the metal sheets 2 under the guidance of a numerically controlled central control unit of known type not illustrated for simplicity; the manipulator device 5 comprises a pair of holding members 6 for the metal sheets 2 displaceable along three cartesian axes to a plurality of different positions along the paths indicated in broken outline in FIG. 2, a pair of extensible arms 7 which are independent from one another, and a horizontal cross piece 8 carried so as to be rotatable about its longitudinal axis by a fixed central support 9 disposed in correspondence with a transverse plane of symmetry of the device 5, substantially vertical and perpendicular to the longitudinal axis of the cross piece 8, and passing between the arms 7; these are disposed parallel to one another and to the said transverse plane of symmetry of the device 5, are extensible in length and are slidably carried by the cross piece 8 with respect to which they are mounted perpendicularly and projecting on respective guides 10 disposed parallel to the longitudinal axis of the cross piece 8. The holding members 6 are each carried by a respective arm 7 fixed in correspondence with the respective free ends thereof, and, according to the invention, are rotatable through 360° about an axis 11 parallel to the plane in which they lie and perpendicular to the longitudinal axis of the arms 7.

According to the invention, the device 5 is provided with motor means for displacing the arms 7 on the cross piece 8, for rotating the members 6, and for extension of the arms 7 themselves, which motor means are interconnected together in such a way as to constrain the arms 7 and their holding members 6 always to displace simultaneously and in a specularly symmetrical manner with respect to the said transverse plane of symmetry of the device 5. In particular, the cross piece 8, which preferably is supported at its opposite ends by further supports 12, rigidly carries by means of brackets 13 respective rotatable prismatic bars 14 and a pair of lead screws 15 and 16 having identical and opposite pitch, and centrally, in correspondence with the support 9, there are respective actuating motors 18, 19, 20 of known type for the bars 14 and the lead screws 15 and 16; a motor 22 carried by the support 9 controls the rotation of the cross piece 8, and together with this the arms 7 rigidly connected to it, for example by means of a gear transmission 23; preferably the arms 7 each include two half arms 25 and 26 articulated together by means of a joint 27 and secured to the cross piece 8 and to the holding members 6 respectively; within the half arms 26 there is disposed a transmission 28, for example a chain, acting to carry the members 6 into rotation about the axis 11; the transmission 28 receives drive from a similar transmission 29 disposed within a branch of the half arms 25, which are preferably fork shaped, through the joints 27; these are also connected to a transmission 30, for example again of the chain type, lodged in the other branch of the half arm 25, and the transmissions 29 and 30 are actuated in a known manner by motors 18 and 19 through the bars 14; these are in fact slidably engaged by respective gears, not illustrated for simplicity, of the transmissions 29 and 30, lodged within a sleeve end 31 of the half arms 25 by means of which the arms 7 are slidably fixed to the rotatable cross piece 8 and to the bars 14 rigidly connected to it. Within the ends 31 there are also lodged respective nuts 32 of known type engaged by the lead screws 15 and 16, through which the half arms 25 receive drive for translation along the cross piece 8 from the common motor 20.

It is evident that the actuation of the motors 18, 19, 20, these being common to both the arms 7 produces symmetrical and simultaneous activation of these through the transmission means constituted by the bars 14 and the screws 15 and 16 which are connected to the drive take off members of the arms 7, constituted by the nuts 32 and the transmissions 29 and 30; in particular the arms 7 are lengthened and shorted by making the half arms 25 and 26 of each rotate simulaneously in an associated manner by actuating the common motor 19 which, through the associated bar 14 drives the transmissions 30 making the joints 27 rotate; the members 6 are caused to rotate in a similar manner by the common motor 18 which drives the transmissions 29 through the other bar 14; finally, for gripping metal sheets 2 of different widths it is possible to vary the separation of the arms 7 by actuating the motor 20 which puts the screws 15 and 16 into rotation causing symmetrical and simultaneous displacement of the arms 7 along the cross piece 8 in opposite directions.

For the purpose of being able to turn the metal sheets 2 also parallel to the plane in which they lie, the device 5 according to the invention further includes a rotatable base 35 disposed adjacent to the cross piece 8, between the arms 7, in correspondence with the plane of symmetry of the device 5; in particular, the base 35 is able to turn about a vertical axis and is carried at the top by the central support 9 which also contains a known, and not illustrated, actuating motor therefor; a table 36 can be firmly fitted on the base 35, preferably in a removable manner, and is adapted to be gripped by the members 6; these are preferably constituted by respective mechanical pincers each including a pair of facing jaws 37 having two gripping sides 38 disposed in adjacent positions in such a way as to be able firmly to grip the metal sheet both from the side and from the edge, and shaped in such a way as to be able to grip the removable table 36 (FIG. 2) between them so as to be able to raise it up from the base 35 in consequence of the mutual approach of the arms 7; for example the jaws 37 can be provided with projecting ribs 39 which can be inserted into a perimetral groove of the table 36 in such a way as to be able to grip the table 36 between them independently from the metal sheet 2 carried on this.

Figure 3:
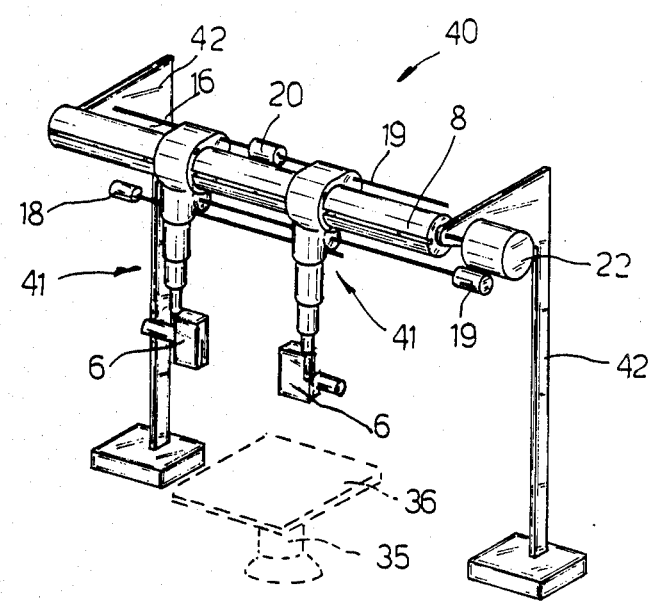
FIGS. 3 and 4 schematically illustrate two possible variants of the device of FIG. 1.
Figure 4:
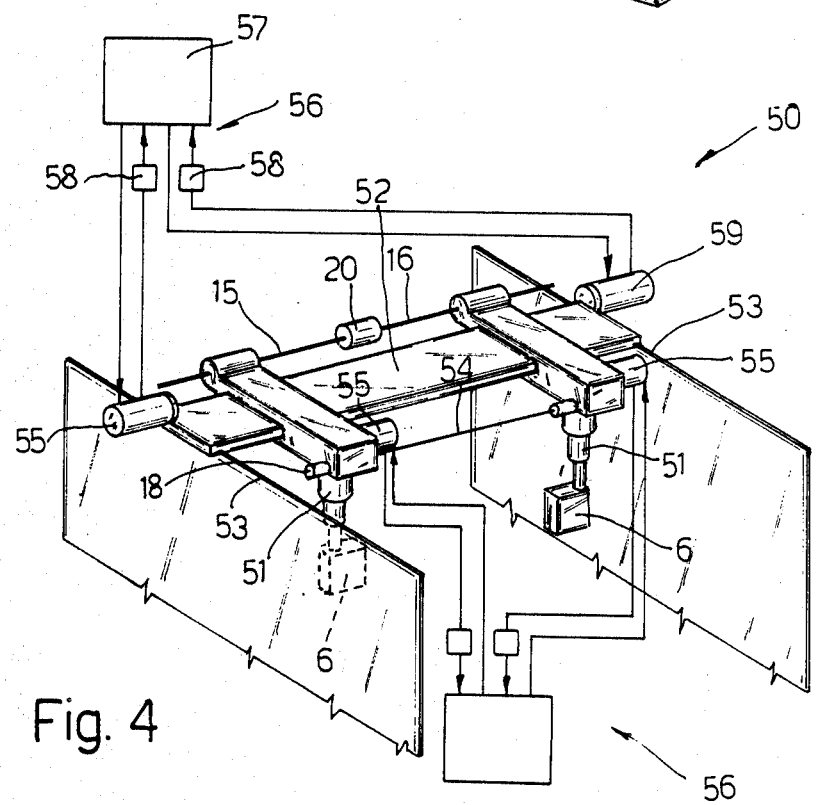

Now making reference to FIGS. 3 and 4, these illustrate, in a schematic manner, two possible variants 40 and 50 of the device 5; the similar or identical details to those previously described are indicated for simplicity with the same reference numerals. In particular, the variant 40 (FIG. 3) differs from the embodiment described by the fact that the articulated arms 7 are constituted by equivalent telescopically extensible arms 41 which are provided with holding members 6 and are slidably mounted on a rotary cross piece 8 entirely similar to the previous one, but mounted on supports 42 above the table 36 and the associated base 35; the movement of the arms 41 is effected in a similar manner to that described above by means of common motors 20, 18, and 19 provided with suitable transmission means of known type which link the arms 41 to move simultaneously and symmetrically with respect to the transverse plane of symmetry passing through the base 35. The variant 50 makes use of telescopic arms 51 entirely similar to the arms 41 and differs from the device 40 by the fact that the rotating cross piece 8 is replaced by a cross piece 52 mounted slidably on a pair of rectilinear guides 53; the simultaneous and symmetrical displacement of the arms 51 and of the holding members 6 is effected by means of common motors 20 and 18 provided with suitable mechanical transmissions with lead screws 15, 16 and 54; on the other hand, according to the invention, the symmetrical and similtaneous displacement of the two ends of the cross piece 52 and the elongation or shortening of each of the telescopic arms 51 is effected by means of respective pairs of independent drive motors 55 which are however connected in an indirect manner, being connected to associated common control devices 56 of known type operable to synchronize their movement; in particular each device 56 includes, for example, an electronic control unit 57 for the associated motors 55 and counter devices or "encoders" 58 which count the number of rotations performed by the associated motors 55 of each pair of motors indicating such information to the central control unit 57 which, in the case of differences, intervenes by making one of the motors 55 slow down or by accelerating the other. In this case, too, the final result consists in constraining the arms 51 to move simulaneously and symmetrically with respect to the mid plane of the device 50.

From what has been described the advantages connected with the manipulator device according to the invention will be apparent; it has a reduced bulk and high operating flexibility in that the holding members, thanks to the fact these are carried by separate arms, can be brought together or spaced according to requirements; the costs are also contained in that the direct interconnection, by means of mechanical transmissions, or indirect interconnection of means of synchroniser devices, between the two arms permits their movements to be controlled with a single numerical control device. Finally, the particular structure of the device according to the invention allows the use of exclusively mechanical holding devices possibly using, for particularly thin and therefore very flexible metal sheets, the auxiliary support offered by the removable table 36 which, being gripped by the holding members can be moved together with the metal sheet being manipulated avoiding flexure thereof.

I claim:

1. A manipulator device particularly for handling metal sheets during folding operations, comprising a pair of holding members and means for displacing the holding members along three cartesian axes to a plurality of different positions, wherein said holding members are rotatable through 360° about an axis parallel to the plane in which they lie and wherein said means for displacing said holding members comprise:

a pair of independent extensible arms each having a free and carrying one of said holding members, said extensible arms being disposed parallel to one another;

a horizontal cross-piece, said arms being slidably mounted perpendicularly of and projecting from said horizontal cross-piece, said cross-piece being rotatable about an axis along which said arms slide; and independent motor means for controlling independently said cross-piece, said extensible arms and said holding members, said device further comprising:

(a) interconnecting means for linking said independent extensible arms for simultaneous displacement of said holding members in a specularly symmetrical manner with respect to a plane of symmetry of said device passing between said arms;
(b) a rotatable base disposed adjacent said cross-piece in correspondence with said plane of symmetry and able to rotate about a vertical axis; and
(c) a table able to be detachably fitted on said base, said motor means being sized to accomplish detachment of said table by gripping it with said holding members and lifting said arms.

2. A device according to claim 1, wherein said axis of rotation of said holding members is perpendicular to the longitudinal axis of said arms.

3. A device according to claim 1, characterised by the fact that the said cross piece (8) is carried rotatably by at least one fixed support (9, 42) and turns about the axis along which the said arms (7) slide.

4. A device according to claim 1, characterised by the fact that the said cross piece (8) is slidably mounted along a pair of rectilinear fixed guides (53) disposed perpendicularly to the axis along which the said arms (7) slide.

5. A device according to claim 1, wherein said holding members are constituted by respective mechanical pincers each comprising a pair of facing jaws having two adjacent gripping sides, the pincers further being shaped in such a way as to be able to grip said removable table between them consequent on the mutual approach of said arms, independently of the sheet supported by the table.

* * * * *